United States Patent

Cucciati et al.

[15] 3,692,983

[45] Sept. 19, 1972

[54] AUTOMATIC THRESHOLD CONTROL CIRCUIT FOR OPTICAL CARD READERS AND SORTERS

[72] Inventors: Carlo Cucciati; Pietro Buttafava, both of Milan, Italy

[73] Assignee: Honeywell Information Systems Italia, Milan, Italy

[22] Filed: July 12, 1971

[21] Appl. No.: 161,582

[30] Foreign Application Priority Data

July 14, 1970 Italy.....................27389 A/70

[52] U.S. Cl.........235/61.11 E, 307/235 R, 328/146, 250/204, 340/146.3 AG, 340/347 P

[51] Int. Cl................................................G06k 7/14

[58] Field of Search............340/146.3; 235/61.11 E; 307/235; 328/146, 151; 250/204

[56] References Cited

UNITED STATES PATENTS

| | | | |
|---|---|---|---|
| 3,602,825 | 8/1971 | Senior | 307/235 R |
| 3,566,133 | 2/1971 | Dorman | 307/235 R |
| 3,225,213 | 12/1965 | Hinrichs et al. | 340/146.3 AG |
| 3,449,741 | 6/1969 | Egerton | 340/347 AD |
| 3,534,334 | 10/1970 | Bartz et al. | 340/146.3 AG |
| 3,599,151 | 8/1971 | Harr | 328/151 |

*Primary Examiner*—Maynard R. Wilbur
*Assistant Examiner*—William W. Cochran
*Attorney*—Fred Jacob et al.

[57] ABSTRACT

A punched card optical reader wherein the presence of a hole is determined by the recognition of a signal level greater than a threshold level and the absence of a hole is determined by the recognition of a signal level less than the threshold level, and wherein means is provided to vary the value of the threshold level in accordance with the quality of the signal levels employed for recognition.

7 Claims, 7 Drawing Figures

Carlo CUCCIATI
Pietro BUTTAFAVA
INVENTORS

By [signature]
ATTORNEY

Carlo CUCCIATI
Pietro BUTTAFAVA
INVENTORS

By
ATTORNEY

AUTOMATIC THRESHOLD CONTROL CIRCUIT FOR OPTICAL CARD READERS AND SORTERS

BACKGROUND OF THE INVENTION

The instant invention relates to a punched card reader wherein the read circuits are provided with an automatic threshold control for compensating for changes in the performance of the reading device.

Equipment for reading and sorting punched cards includes a cabinet provided on its upper portion with a first magazine or hopper which holds the cards to be processed; a card feeding and transporting mechanism which extracts single cards from the hopper in succession, transports them in front of a reading device, and directs the cards along different paths according to the data read therefrom; and one or more collecting magazines which receive the read and sorted cards.

The above-mentioned cabinet further includes a control and supervisory console provided with push buttons and signal lamps. In the interior of the console are the mechanical, electrical and electronic apparatus required for the aforesaid reading and sorting operations, as well as for exchanging information between the reading and sorting equipment and other apparatus connected thereto, such as storage assemblies, printers, input-output equipment for electronic computers, and similar devices.

A card for use in the equipment described is usually formed of a stiff sheet of opaque material, such as cardboard, and carries on its surface a plurality of markings arranged in rows and columns to denote punching positions. For example, one such card has 10 rows and 80 columns of punching positions. The punching of the card provides holes of predetermined form in precise correspondence with a number of such positions. The particular location and quantity of the holes punched in a card correspond to the information to be represented by the card. A card reading device, adapted for detecting and counting the punched positions of the card, translates the represented information into a succession of electrical pulses. The reading device may be one of various types which operate by optical, contact, or capacitive means, or by other means. One of the most widely utilized and easily employed card reading devices, is of the optical type. This type is based on the principle that the holes punched in the cards are readily transversed by light rays, which traversals may be detected by any one of many types of electrical photosensitive elements. These elements include the more easily employed solid state elements, such as photodiodes, phototransistors, and photoresistors. The preferred types of such solid state elements are the phototransistors and photodiodes.

The punched card reading operation may be by rows or by columns, i.e., either all of the holes in a column or all of the holes in a row are read at once. In order to perform one of such operations, a plurality of photosensitive elements is provided, equal in number to the number of punching positions in each row or in each column. Such photosensitive elements are aligned parallel to the direction of the rows or the columns and the card is moved in a direction perpendicular to the line of photosensitive elements. To read the above-described exemplary card by rows, an array of at least 80 photosensitive elements is required; to read such card by columns, an array of at least 10 photosensitive elements is required. It is apparent that column reading is less costly due to the smaller required number of photosensitive elements.

The light source employed for generating the light to be detected by the photosensitive elements may be a single lamp (usually of the incandescent type) combined with a set of cylindrical lenses and slit collimators. Such assemblage produces a flat bundle of parallel light rays which effectively illuminate only the associated array of photosensitive elements. The light source may also consist of a plurality of solid state photoemitters each photoemitter being associated with a corresponding photosensitive element. The passage of a punched card between a light source and its associated set of photosensitive elements permits the illumination of only those elements which correspond to the holes in the card. The thickness of the flat light ray bundle is limited to provide that only a single card row, in row reading, or a single card column, in column reading, can be illuminated at a particular time.

Each photosensitive element is connected to a respective circuit member for determining the illuminated state of such photosensitive element for timing the operation thereof. Such circuit member includes a scanning circuit and a threshold circuit. The threshold circuit has the function of distinguishing the signal generated by an illuminated photosensitive element from that generated by a nonilluminated photosensitive element.

Prior art reading devices which have employed such circuits are provided with a fixed threshold level or with a manually adjustable threshold level. However, both of these types of prior art devices have a number of disadvantages. Thus, the amount of illumination of the photosensitive elements varies between a lower level corresponding to the absence of a hole, and an upper level corresponding to the presence of a hole. In the worst cases the ratio of these lower and upper illumination levels is 1 to 5, and the average value between these levels may be conveniently chosen for the threshold level. If, for any reason, the emission of the light source is reduced, for example by a reduction in the lamp supply voltage, by aging of the light source, or by dirt or scratches affecting the optical numbers, both of the illumination levels are lowered. In such instance, if the upper illumination level becomes less then the threshold level, the reading device will not detect the holes. If, on the other hand, the emission of the light source is increased, for example by an increase in the lamp supply voltage, both of the illumination levels are increased. In this instance, if the lower illumination level exceeds the threshold level, the reading device erroneously signals the presence of holes in all positions. A similar effect occurs even though the light emission continues unchanged, if the current flowing through the photosensitive element increases because of a temperature increase. In this instance both of the current levels increase, and the lower illumination level may exceed the threshold level.

It is the object of the instant invention to provide a threshold circuit particularly adapted for use with a card reading device, wherein the threshold level constantly remains between the upper and the lower levels of the input signal.

SUMMARY OF THE INVENTION

This object is achieved by employing as the threshold level a d-c voltage proportional to the maximum level of the input signal. For example, a value of voltage equal to the one-half of the maximum voltage value of the input signal may be employed as the threshold value. In particular, the maximum level of this input signal is elected as the level reached by the signal during the interval between the passage of two consecutive cards, during which the light from the light source may freely reach the photosensitive elements. This level, reduced, for example, by one-half, is stored for a sufficient time and applied to a first input lead of a comparator circuit. The actual signal received from a photosensitive element is applied to the second input lead of the comparator circuit. During the passage and reading of the card, the threshold level is maintained equal to the stored level, so that the comparator circuit delivers at its output lead either an enabling signal or an inhibiting signal (i.e., a binary "1" or "0" signal) according to whether the signal applied to its second input lead is respectively greater or less than that applied to its first input lead.

During the interval between the passage of the card last read, and the passage of the following card, the stored level is adjusted in accordance with the detected variations of the maximum level. It is apparent that any variation in the maximum level causes a correspondent variation in the threshold level.

In a preferred embodiment of the invention the reading device comprises a photosensitive element, which is preferably a photodiode or a phototransistor, coupled to the input lead of a first amplifier. The output signal of the amplifier is transmitted through two separate circuit branches, the first branch comprising a voltage divider followed by an electronic switch and an element adapted to stored the signal received during the interval between the passage of two consecutive cards. The electronic switch is closed during the interval between the cards and is adapted to provide for storage of such signal. This stored signal is applied to the first input lead of a comparator, which is provided with a second input lead that is directly connected to the second circuit branch.

The comparator delivers on its output lead a first binary signal if the signal applied to its second input is greater than the signal applied to its first input lead, and a second binary signal if the signal applied to its second input lead is less than the signal applied to the first input lead.

BRIEF DESCRIPTION OF THE DRAWING

The invention will be described with reference to the accompanying drawings, wherein.

DESCRIPTION OF THE PREFERRED EMBODIMENT

Figures 1, 3A, 3B, 4A, 4B:
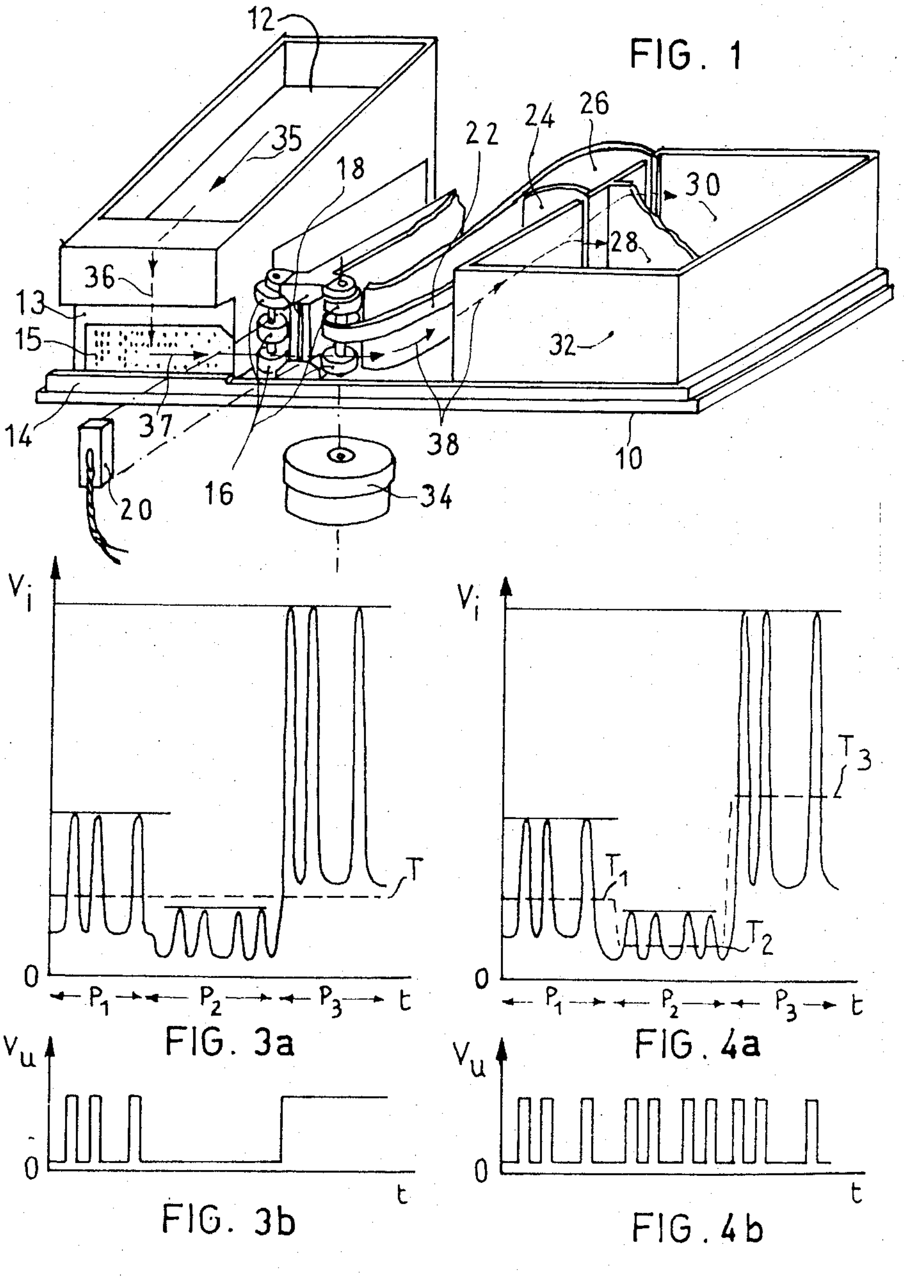
FIG. 1 is a partially exploded perspective view of the portion of a card reader that comprises the magazine holding the cards to be read, the reading devices, the mechanism for transporting and sorting the cards, and the collecting magazines.
FIGS. 3*a* and 3*b* show the respective waveforms of a reading signal having upper and lower levels varying in time which are compared with a fixed threshold level, and the output signal resulting from such comparison.
FIGS. 4*a* and 4*b* show the respective waveforms of a read signal having upper and lower levels varying in time which are compared with a variable threshold level and the output signal resulting from such comparison.

In the card reader of FIG. 1, a base plate 10 supports a card feed hopper 12, a feeding mechanism 13, an aligning device (not shown), and an aligning bar 14. Magazine 12, mechanism 13 and bar 14 form the card feeding station. The reading station comprises a set 16 of mover rollers, an optical assemblage 18 for generating a flat bundle of parallel light rays, and a set 20 of photodetectors. An output track formed by a set 22 of metallic guides which terminate in two deflectors 24 and 26 provide for directing the cards into the respective bins 28 and 30 of a magazine 32. One of bins 28 and 30, for example bin 28, is assigned to receive the accepted cards, and the other bin, for example bin 30, is assigned to receive the rejected cards. An assemblage 34 for generating scanning signals is rigidly connected to one shaft of mover rollers 16 in order to generate scanning signals which are synchronized with the position of the card relative to the reading station.

In operation, the cards held in hopper 12 are separately removed therefrom by feeding mechanism 13. The aligning device provides for the cards to bear against aligning bar 14, as shown by the illustrated card 15. Each card follows the path indicated by arrows 35 and 36. From bar 14 a card is transported in the direction of arrows 37 to the reading station, where mover rollers 16 force the card to pass between optical assemblage 18 and the set 20 of photodetectors. From the output of the reading station, a card follows the path indicated by arrows 38 along the set 22 of guides. According to whether a card is accepted or rejected, deflector 24 directs the card into bin 28 and deflector 26 directs the card into bin 30.

Figure 2:
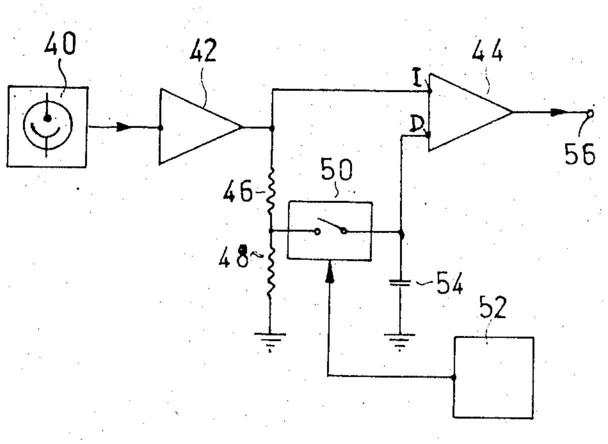
FIG. 2 is a block diagram of the circuit of the invention.

A circuit of the invention is connected to the output terminal of each of the photodetectors 40 of set 20. Such circuit comprises, FIG. 2, a first linear amplifier 42 whose input lead receives the signal delivered by photodetector 40. The output signal of amplifier 42 is transmitted directly to a first input lead I of a differential amplifier 44 and transmitted to a voltage divider formed of resistors 46 and 48. An electronic switch 50 selectively couples the common connection point of resistors 46 and 48 to a storage capacitor 54, which capacitor, in turn, is connected to a second input lead D of differential amplifier 44. Switch 50 is controlled by a scanning signal generated by a timing circuit 52, which is coupled to assemblage 34 of the reader of FIG. 1.

According to the state of illumination or darkness of photodetector 40 a corresponding signal is delivered to the input lead of amplifier 42. For example, a signal of relatively high voltage is delivered when photodetector 40 is illuminated and a signal of relatively low voltage is delivered when photodetector 40 is not illuminated. A signal dependent on the input signal received thereby is available on the output lead of amplifier 42. For a linear direct amplifier, this output signal voltage is high when the input signal voltage is high and is proportional thereto.

The output signal delivered by amplifier 42 is applied directly to input lead I of differential amplifier 44. Input lead D of amplifier 44 receives a substantially steady voltage whereby amplifier 44 operates as a threshold amplifier. The substantially steady voltage applied to input lead I of differential amplifier 44 is provided by capacitor 54, which is charged by the closure of electronic switch 50 under control of the signal delivered by timing circuit 52 during the time interval between the passage of one card and the next. During such time interval the illumination of photodetector 40 is at a maximum. However, the voltage stored by capacitor 54 depends not only on the degree of illumination of photodetector 40, but on all other above-mentioned factors, such as dirt on the optical apparatus, aging of the photodetector, temperature changes, etc. Therefore this stored voltage, which functions as a threshold voltage for amplifier 44 may vary with time, but always remains between the maximum and the minimum levels of the voltage appearing on the output lead of amplifier 42 during the reading of a card.

The advantage of the threshold voltage level varying in accordance with the maximum value of the output voltage of amplifier 42 may be readily comprehended by an examination of the waveforms of FIGS. 3*a* and 3*b* and 4*a* and 4*b*.

In the operation shown in FIG. 3*a*, the input signal voltage $V_i$ is compared with a fixed threshold voltage T by an amplitude discriminating circuit. In FIG. 4*a* the signal voltage $V_i$ is compared by the same circuit with a threshold voltage which is proportional to the maximum value of voltage $V_i$ and which is assumed to reach three different levels $T_1$, $T_2$, $T_3$. FIGS. 3a and 4a show the variation of the signal voltage $V_i$ which takes place while reading the cards during three different periods, $P_1$, $P_2$, $P_3$, during which it is assumed that the illumination conditions of the photodetector are modified by some of the above-mentioned factors.

In period $P_1$ the threshold voltage level is adequate for the amplitude of the swing of voltage $V_i$, voltage $V_i$ being greater than threshold voltage T when card holes are aligned with the light source and the photodetectors and less than voltage T when the opaque card is interposed therebetween. In this period $P_1$, as may be seen in FIG. 3*b*, the output terminal 56 of amplifier 44 of FIG. 2 delivers a pulse of output signal voltage $V_u$ corresponding to the reading of each hole.

In period $P_2$ it is assumed that the amplitude of the swing of signal voltage $V_i$ is reduced by one or more of the above-mentioned factors. Accordingly, voltage $V_i$ never exceeds the value of threshold voltage T, so that output signal voltage $V_u$ of amplifier 44 remains continuously at its lower level (FIG. 3*b*).

In period $P_3$, on the other hand, it is assumed that the amplitude of voltage $V_i$, while having an adequate swing, remains continuously greater than the threshold voltage T. Accordingly, output voltage $V_u$ of amplifier 44 remains continuously at its upper level.

It is apparent that during periods $P_2$ and $P_3$ of FIGS. 3*a* and 3*b* the operation of the card reader is faulty, and the output signal information does not correspond to the information represented by the holes in the card. However, in the present invention, FIGS. 4*a* and 4*b*, this faulty operation is prevented.

Thus during period $P_2$ the threshold voltage level decreases, to remain between the minimum and maximum values of signal voltage $V_i$; whereas during period $P_3$, the threshold level increases, to continue to remain between the maximum and minimum values of voltage $V_i$. Accordingly, in the present invention, the threshold voltage level always remains between the upper and lower voltage levels of the read signal voltage $V_i$, whereby the discriminator output voltage $V_u$ reproduces the read signal pulses with constant amplitude and duration output pulses independent of any variation affecting the light source, the optical assemblage, or the photodetectors.

Figure 5:
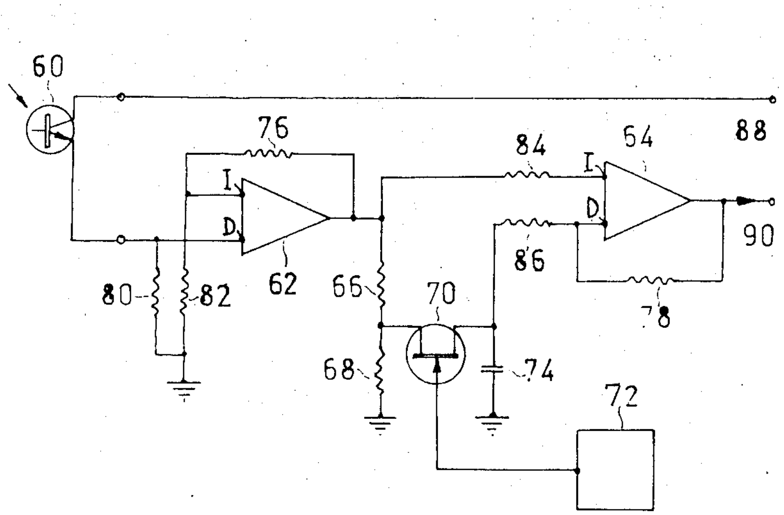
FIG. 5 is a diagram of a particular embodiment of the invention.

In the embodiment of FIG. 5, differential amplifiers of the same type may be employed for both the linear amplifier and the threshold discriminator, such differential amplifiers being commercially available in the form of integrated circuits. A photodetector 60, which in this instance is a phototransistor, has the collector thereof connected to a positive voltage supply terminal 88 and the emitter thereof connected to a terminal of a resistor 80 whose other terminal is grounded.

The common connection point between the emitter of phototransistor 60 and resistor 80 is connected to a direct input lead D of a differential amplifier 62. An inverting input lead I of differential amplifier 62 is connected to the output lead of such differential amplifier through a resistor 76 and to ground through a resistor 82. Resistors 76 and 82 form a voltage divider which applies a negative feedback voltage to the inverting input lead I to improve the linearity and stabilize the gain characteristics of the amplifier. The output lead of amplifier 62 is connected through a resistor 84 to the inverting input lead I of a differential amplifier 64 and through a voltage divider formed by resistors 66 and 68, to the source electrode of a field effect transistor 70. The drain electrode of transistor 70 is connected to a storage capacitor 74, and through a resistor 86, to the direct input lead D of differential amplifier 64.

The gate electrode of field effect transistor 70 is connected to a timing circuit 72. A resistor 78 is connected between output lead 90 of differential amplifier 64 and its direct input lead D, thereby providing a limited degree of positive feedback for the purpose of enhancing the amplifier's characteristic of amplitude discrimination for an input signal applied to the inverting input lead I thereof.

When phototransistor 60 is illuminated and conducting, a relatively high voltage is developed across resistor 80. Accordingly, a relatively high voltage is applied to the direct input lead D of differential amplifier 62, causing a relatively high output voltage to be present on its output lead. This output voltage is applied to the inverting input lead I of differential amplifier 64. Applied to the direct input lead D of amplifier 64 is the threshold voltage stored on capacitor 74, this threshold voltage being a constant predetermined fraction of the high level voltage delivered by amplifier 62. Differential amplifier 64 operates as an amplitude discriminator, or threshold circuit, whereby its output voltage has a first predetermined value when the voltage on its inverting input lead I is greater than that on its direct input lead D, and a second predetermined value, substantially different from the first, when the voltage on its inverting input lead I is less than that on its direct input lead D. Capacitor 74 is periodically recharged, in the intervals between the passage of one card and the next, to a voltage which is a constant fraction (for example one-half) of the relatively high voltage which is delivered by amplifier 62 during such intervals. In these intervals a signal delivered by timing circuit 72 switches on field effect transistor 70. Since the voltage across capacitor 74 thereby depends on the output voltage of amplifier 62, any change of the latter voltage, because of any factor, is effective to correspondingly change the threshold value stored by capacitor 74. Thus, the threshold voltage in the embodiment of FIG. 5 is always maintained between the maximum and minimum values of the output voltage of amplifier 62.

It is to be understood that improvements, modifications, and additions of parts may be made to the threshold control circuit described herein, without departing from the spirit and scope of the invention.

What is claimed is:

1. A punched card optical reading device comprising coupled light source means and photodetecting means for converting optical stimuli into electrical high and low voltage signals, a threshold circuit comparator coupled to said photodetecting means and responsive to said voltage signals and a threshold voltage to convert said voltage signals into electrical binary level signals, and automatic threshold control means for compensating for changes in the performance of said reading device, said threshold control means comprising storage means for storing a reference threshold voltage and circuit means to enter into said storage means said reference threshold voltage derived from and proportional to the voltage signal produced by said photodetecting means during the interval between passage of each card and the next through said reading device, and means to apply said reference threshold voltage to said threshold circuit comparator.

2. The punched card reader of claim 1, wherein said automatic threshold control means comprises a first amplifier stage having input and output leads, a voltage divider for providing an output voltage, and an electronic switch, said input lead being coupled to said photodetecting means, said output lead being connected to said voltage divider, the output voltage of said voltage divider being coupled to said storage means of said automatic threshold control means through said electronic switch, said switch being closed by an external timing signal during the time interval between the passage of two consecutive cards.

3. The punched card reader of claim 2, wherein said first amplifier stage is a linear amplifier and said storage means is a capacitor having a capacitance sufficient to maintain a substantially constant threshold voltage during the time for reading a card.

4. The card reader of claim 3, wherein said linear amplifier consists of a differential amplifier having direct and inverting input leads, the signals delivered by said photodetecting means are applied to said direct input lead, and a negative feedback network is connected to said differential amplifier to provide negative feedback for increasing the linearity and stability of said amplifier.

5. The card reader of claim 3, wherein said electronic switch consists of a field effect transistor whose source electrode is connected to said voltage divider, whose drain electrode is connected to said storage means, and whose gate electrode is connected to the output lead of an external timing signal generator for controlling said field effect transistor to conduct during the time interval between the passage of two consecutive cards.

6. The optical card reader of claim 3, wherein said threshold circuit comparator comprises a differential amplifier, and a positive feedback means is coupled to said differential amplifier to provide positive feedback for enhancing the amplitude discriminating characteristics for the voltage signals applied to said threshold circuit comparator.

7. In a punched card reader wherein the presence of a hole is determined by the quantity of light transmitted to a photosensitive detector, and wherein a comparator compares an input signal representing the quantity of light received by said detector with a threshold signal and delivers an output signal having a first value when the level of said input signal is greater than the level of said threshold signal and having a second value when the level of said input signal is less than the level of said threshold signal, an improved threshold signal generating means comprising: threshold signal storage means for storing a signal level for the time required for a punched card to pass said photosensitive detector, and means for inserting into said storage means a new signal level in the interval between the passage of each two successive cards past said photosensitive detector, said new signal level being a predetermined proportion of the level of said input signal during said interval to provide that said new signal level is intermediate to the level of said input signal that represents the presence of a hole in a punched card and the level of said input signal that represents the presence of an unpunched portion of a card.

* * * * *